Aug. 4, 1959  J. J. MURTAUGH ET AL  2,898,209
METHOD OF EXTRACTING HOPS
Filed July 17, 1956
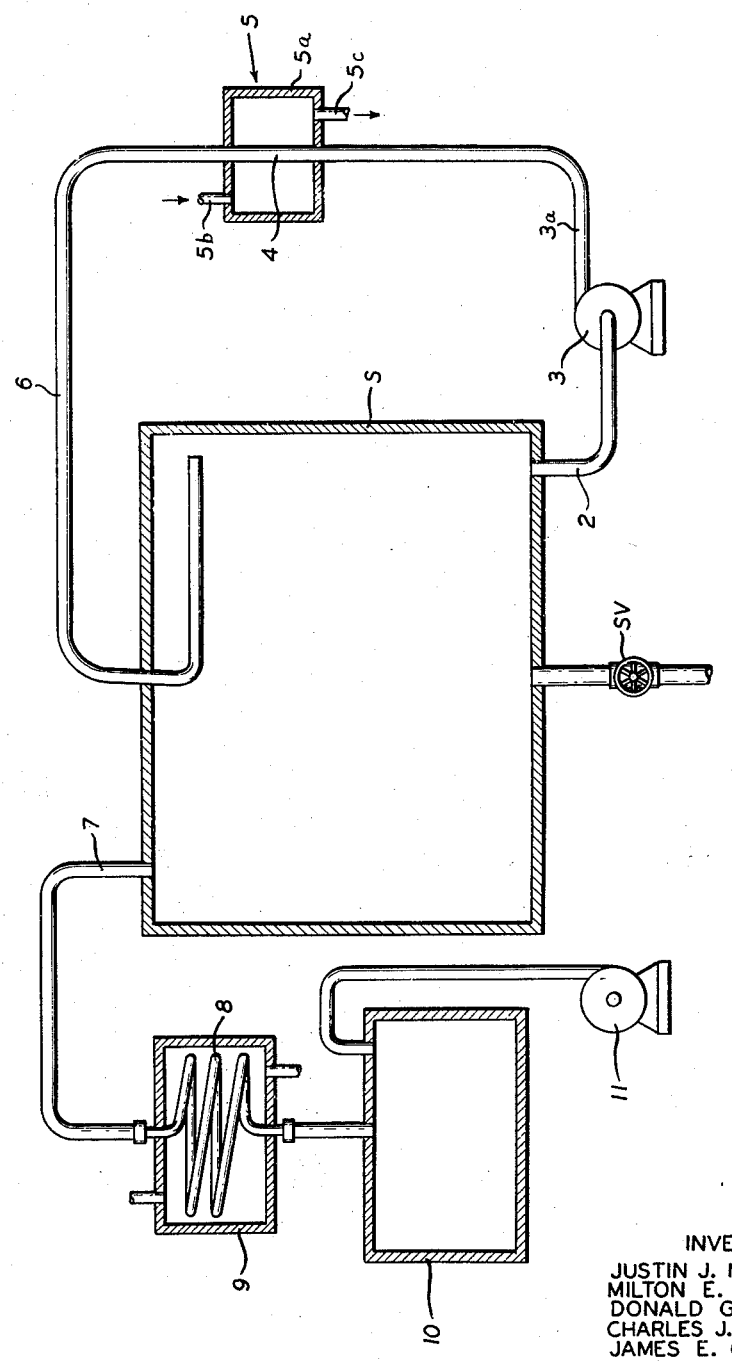
INVENTORS
JUSTIN J. MURTAUGH
MILTON E. LAVRICH
DONALD G. RUFF
CHARLES J. KRUECK
JAMES E. GRANT
BY Mock+Blum
ATTORNEYS.

United States Patent Office 2,898,209
Patented Aug. 4, 1959

2,898,209

METHOD OF EXTRACTING HOPS

Justin J. Murtaugh, Guilford, and Milton E. Lavrich, Lawrenceburg, Ind., and Donald G. Ruff, Wauwatosa, and Charles J. Krueck and James E. Grant, Milwaukee, Wis., assignors, by mesne assignments, to Blatz Brewing Company, Chicago, Ill., a corporation of Delaware Application July 17, 1956, Serial No. 598,481

5 Claims. (Cl. 99—50.5)

Our invention relates to a new and improved hop extract; to a new and improved method of making a hop extract; and to a new and improved hopped beverage, such as alcoholic malt beverages exemplified by beer and ale.

While the invention applies to the treatment of any part of the hop plant, it refers particularly to the treatment of the cones of the hop plant. These cones are preferably extracted in the whole state, but they may be cut, ground, or otherwise comminuted.

It is well-known that vine-fresh hop cones have a resinous, yellow, bitter powder, which is designated as lupulin.

It is also well-known that said yellow powder contains hop oil, and that it also contains several resins.

One of these resins is known as alpha-resin or the humulone complex. This humulone complex includes humulone, iso-humulone, co-humulone and ad-humulone. These are respective compounds. This complex is generally known in brewing as humulone. This complex includes one of the hop-bitter acids, known as the alpha-acid. Whenever reference is made herein to alpha-resin, this also refers to the humulone complex. The humulone complex forms salts, like a monobasic acid.

Another resin in said yellow powder is known as the beta-resin or lupulone. It contains a hop-bitter acid, known as beta-acid, which also forms salts, like a monobasic acid.

Said yellow powder also contains a resin which is known as gamma resin.

Pages 218–220 of vol. 11, part A, of "Chemistry of Carbon Compounds," published in 1953 by Elsevier Publishing Company, describe humulone and lupulone and state their chemical structures.

Humulone, $C_{21}H_{30}O_5$, consists of yellow crystals, which have a melting point of 55° C.

Lupulone has the general formula $C_{26}H_{38}O_4$, and it has a melting point of 92° C.

It is well known that the alpha-resin is the most valuable brewing ingredient. There are various methods of calculating the brewing value of hops.

The formula used herein is:

Brewing value=percentage by weight of alpha-resin plus one-fourth of the percentage by weight of beta-resin.

There are two well-known methods for estimating alpha-resin and beta-resin in hops, namely, the gravimetric method and the spectrophotometric method. These two methods are described in "Methods of Analysis, American Society of Brewing Chemists," 5th edition, published in 1949; and in "Analytical Chemistry," vol. 126, page 83, published in 1954. These two methods are used in making the estimations later reported herein.

Since hops differ widely in composition, and different varieties of hop cones have different percentages of alpha-resin and beta-resin, a statement of the percentages of alpha-resin and beta-resin in all hop cones is impossible.

However, as one example, an analysis of conventional dried seedless hop cones grown in 1955 in the Yakima district, State of Washington, shows the following, in percentages by weight:

TABLE NO. 1

| | Percent |
|---|---|
| Water | 8.63 |
| Alpha-resin | 6.14 |
| Beta-resin | 11.77 |
| Gamma-resin | 1.61 |

The brewing value is calculated as 6.14 plus 2.94=9.08.

Table No. 1 illustrates freshly dried conventional hops. The maximum brewing value of freshly dried hop cones, as thus calculated, depends on the variety. California hops and imported hops have lowest brewing value. Idaho and Yakima hops have highest brewing value.

It is well known that when conventional dried hops or hop cones are stored, even under refrigeration, there is a loss of brewing power, due to resinification of the original alpha-resin and beta-resin.

Thus, an analysis of freshly-dried conventional hop cones of said Yakima variety, 1954 crop, showed the following:

TABLE NO. 2

| | | |
|---|---|---|
| Alpha-resin | percent | 6.44 |
| Beta-resin | do | 10.09 |
| Brewing value | | 8.96 |

After being stored for nine months under refrigeration, the analysis of the hop cones mentioned in Table No. 2 showed the following:

TABLE NO. 3

| | | |
|---|---|---|
| Alpha-resin | percent | 5.56 |
| Beta-resin | do | 10.09 |
| Brewing value | | 8.08 |

An analysis of freshly dried conventional Oregon hop cones (1952 harvest) and an analysis of hop cones made in June 1955, showed the following:

TABLE NO. 4

| | Freshly Dried | June, 1955 |
|---|---|---|
| Alpha-resin | 5.67 | 2.75 |
| Beta-resin | 10.78 | 11.90 |
| Brewing Value | 8.36 | 5.72 |

Vine-ripe hop cones usually have 65% to 75% of original water by weight. When dried in the usual manner, they usually have 8% to 10% of water by weight.

The alpha-resin and beta-resin of the hop cones are designated as the soft resins. The gamma of the resin hop cones is designated as the hard resin. These soft resins and said hard resin and hop oil are soluble in methanol and insoluble in water.

Vine-ripe hop cones have other ingredients which are insoluble in methanol, and which are soluble or dispersible in water. These water-soluble and methanol-insoluble ingredients include tannins, proteins, certain nitrogenous substances, carbohydrates and pectin.

In addition to having high brewing value, the alpha-resin has strong antiseptic powers, which are valuable in brewing and for other purposes.

As stated in page 181, vol. I (published in 1934) of the Supplement to Thorpe's "Dictionary of Applied Chemistry," the alpha-resin at a pH value of 5.4, has about three times the antiseptic power of the beta-resin. As also stated therein, certain natural ingredients of the vine-rip hop cone are resinified during harvesting, drying and storage, to produce the alpha-resin and the beta-resin, which are in turn transformed into gamma-resin. As further stated therein, drying the hop cones results in a considerable loss of antiseptic power, namely, a loss of 60%, even if low-temperature drying is used, and the storage results in an additional loss of 6% in antiseptic power. This is is due to the resinifaction of the soft resins to the hard gamma-resin.

It has been proposed for many years to dry the hop cones in the conventional manner until they have substantially 8% to 10% of water, and then to extract the freshly-dried hop cones with methanol, in order to provide a hop cone extract. However, such prior processes have not gone into any substantial commercial use. In such prior processes, the process resulted in substantial resinification of the valuable alpha-resin and of the beta-resin to the valueless gamma-resin, and the hop oil was driven off when the methanol solvent was evaporated. These facts are stated in "Brewing Science and Practice," by H. Lloyd Hind, vol. I of 1938 edition, page 381; volume I of the 1950 edition, page 382.

According to one embodiment of this invention, the starting material consists of the whole, undried, vine-fresh hop cones. In this starting material, the vine-fresh hop cones have all their original water. As above noted, the water may be 65% to 75% of the weight of the vine-fresh hop cones. These vine-fresh hop cones starting material also have all their original non-aqueous ingredients in original condition or in substantially original condition.

In order to get a final hop extract for use in brewing or for other purposes, with a high percentage of alpha-resin and beta-resin, certain factors, later fully disclosed, are important. Otherwise, the final brewing extract has little or no brewing value.

The vine-fresh hop cones may be extracted immediately after harvesting, or prior to any substantial heating or browning of said vine-fresh hop cones. Thus, if vine-fresh hop cones are stored without refrigeration, they do not brown or heat substantially six hours after being picked. In such case, the hop cones have substantially all their original water, and substantially all their original non-aqueous ingredients in substantially original condition, to be used as starting material herein.

The stability of the vine-fresh hop cones depends upon the natural hops and the variety of the natural hops. That is, different batches of hops of the same variety may differ in stability, and different varieties of hops differ in stability. There are also differences in the content of alpha-resin and beta-resin in different batches of hops of the same variety, and in hops of different varieties. Hence all figures and details stated herein are subject to variation.

If the vine-fresh hop cones are stored at 4° C., they usually do not suffer any substantial deterioration during a storage period which may be up to two days.

Instead of using the vine-fresh hop cones, said vine-fresh hop cones may be promptly frozen dry, preferably by the well-known quick freezing, cold pack method, to a temperature of minus 20° C., and stored at minus 20° C. Such frozen, vine-ripe hop cones can also be used as starting material herein. The examples later states herein, refer to the extraction of such frozen, vine-ripe hop cones. Quick freezing, and the cold pack method in which the frozen product is not immersed in liquid, are well-known, and described, for example, in "The Chemistry and Technology of Food and Food Products," published in 1944 by Interscience Publishers Inc.

Preferably, but without limitation thereto, the frozen, vine-ripe hop cones are at minus 20° C., without any preliminary thawing, when the frozen, vine-ripe hop cones are contacted with the extracting methanol, so that the frozen, vine-ripe hop cones are thawed to melt their water and are then warmed to the extracting temperature by contact with the solvent.

Thus, the solvent may be anhydrous methanol at a temperature of 30° C., and the frozen, vine-ripe hop cones may be immersed in said solvent, so that the frozen water of the hop-cones is melted and the temperature of the hop cones is raised to 30° C., while the frozen hop-cones are wholly immersed in the solvent. When thus initially immersed in the solvent or otherwise contacted with the solvent, the frozen hop-cones have all their original content of water, such as 65% to 75% of water by weight.

Without limitation thereto, the improved final hops extract consists substantially wholly of the methanol-soluble and water-insoluble ingredients, which are conveniently designated as the "resin phase" or "hops resin."

By eliminating or minimizing the percentage of the hop tannins and possibly other methanol-insoluble and water-soluble ingredients which have a harsh, astringent taste, an alcoholic beer or other hopped malt beverage or alcoholic beverage of superior flavor and character can be produced.

We prefer, without limitation to the use of methanol, to use pure, anhydrous methanol as the extracting solvent. Instead of using anhydrous methanol, we can use a mixture of methanol and water, which preferably has not more than 15% of water by volume. If the extracting solvent is a mixture of methanol and water which has more than 15% of water by volume, the efficiency of extraction of the valuable soft alpha-resin and soft beta-resin is decreased. Preferably, if the extracting solvent is a mixture of methanol and water, it has a maximum of ten percent of water by volume. The methanol which is used in anhydrous form, or mixed with water, may be the pure type of methanol which is described in page 1520 of the 24th edition of "The Dispensatory of the United States of America." This methanol has a specific gravity of 0.792 and it boils at 64.7° C., under normal atmospheric pressure of 750 millimeters of mercury. The methanol may be the substantially anhydrous, commercial type which is described in page 431 of the 1942 edition of "The Condensed Chemical Dictionary." This commercial methanol has a boiling point of 66.78° C. at said normal pressure, not more than 0.1% of water, and has not less than 99.85% of methanol.

The extracting temperature may be as low as 30° C. However, in order to shorten the period of extraction, an extracting temperature of 48° C. to 55° C. may be used. Thus, the extracting temperature may be 50° C. The extracting period should be as short as possible. Overheating should be prevented during the entire process, as otherwise, there is a large loss and even a total loss of brewing value, because of loss of the valuable soft alpha-resin and beta-resin.

The invention is further explained in the description and in the annexed drawing.

The drawing diagrammatically uses the apparatus which is used to evaporate methanol and water from the initial, liquid extract.

The final extract or hops resin which is used in brewing and for other purposes, cannot have an invariable composition. This composition will depend upon the composition of the starting material.

One example of a final extract or hops resin which can be used in brewing and for other purposes, and which is made according to this invention with the use of anhydrous methanol as the extracting solvent, using frozen, vine-fresh hop cones as starting material, is stated below:

TABLE NO. 5

| Ingredient | Percentage by Weight |
|---|---|
| Alpha-resin | 25.20 |
| Beta-resin | 51.30 |
| Gamma-resin | 12.90 |
| Total alpha-resin and beta-resin | 76.50 |
| Other ingredients, which are calculated as solids | 15.30 |
| Total Solids | 91.80 |
| Water | 8.10 |

According to the method of estimating brewing value used herein, this final extract or hops resin has a brewing value, 25.20 plus 12.82=38.02.

This extract includes some or all of the hop oil.

As above noted, anhydrous methanol is used as the extracting agent.

This anhydrous methanol extracts water from the frozen on unfrozen hop cones, so that the original methanol extract contains water. Hence the original methanol extract contains some water-soluble material, which is insoluble in methanol and which is dissolved in the water of the initial extract.

Also, as later disclosed, when the original methanol extract is concentrated by evaporating its methanol and water, it is highly preferred to stop the evaporation to produce a concentrate which has a small percentage of methanol, and enough residual water to retain all or at least a major part of the extracted water-soluble and methanol-insoluble ingredients in aqueous solution, thus providing a concentrate which has a resin phase and a water phase. When this water phase is separated from the resin phase, the resin phase may contain some dispersed water, so that the resin phase is not anhydrous.

Also, as later disclosed, the resin phase can be washed with water, in order to remove substantially all of the residual methanol from said resin phase.

Since the resins of said resin phase are dispersible in the wash water, the final extract or final "hops resin" which is disclosed in Table 5 is not anhydrous.

This final brewing extract or hops resin is stable at 20° C.–30° C., for a substantial period, so that the valuable soft resins are not converted to the hard gamma resin by storage.

By decreasing the percentage of water below 8.10% by weight, the brewing value can be increased. In general, the percentage of water should not exceed 10% by weight.

This typical final brewing extract or hops resin of Table 5 is a dark-green, viscous paste at 25° C.

At 25° C., its specific gravity is slightly greater than one. It is immiscible with water at 20° C., and it is very tacky and adhesive at 20° C.–30° C.

When heated to 45° C., it becomes a very viscous liquid, whose viscosity decreases rapidly at temperatures above 45° C.

When heated to 50° C., said extract or hops resin is easily dispersed in water to make a stable dispersion.

Hence an aqueous dispersion of said extract may be made by heating it to 50° C. and mixing it with water at 50° C.

When such an aqueous dispersion is made at 50° C. with equal parts by weight of said extract and water, the pH value of said mixture or dispersion is below seven at 50° C., such as a pH value of 5.8.

One important factor of the improved final extract is the brewing value.

Thus, the percentage of total solids or total non-aqueous material may vary substantially, depending upon the starting material and variations in the process. However, the brewing value may nevertheless be high, if there is a high percentage of alpha-resin.

Thus, it is possible to use a starting material which yields more than 25% of alpha-resin in the final extract, such as 29% or more of alpha-resin. In such case, a high brewing value is secured, even if the total weight of alpha-resin and beta-resin is substantially less than 76.50% of the weight of the final brewing extract or hops resin.

The brewing value as calculated above, may be in the range of 36 to 40, and the invention includes a brewing extract whose brewing value may be as low as 30.

Another important feature is to produce a brewing extract which is easily dispersible in the wort at 50° C. and above, and which releases the hop flavor when the wort is boiled at 100° C., in the usual process of making beer.

On the average, when thus used in making beer, one unit by weight of the brewing extract may have the same brewing value or hopping effect as at least seven units of average dried hops.

When heated to 50° C., the extract is easily miscible with an equal weight of corn sirup, namely, the liquid which is made from the starch of maize by incomplete hydrolysis. This mixture or dispersion is stable at 20° C.–30° C. Such a mixture is fluid and more easily handled than the pure brewing extract. Such a mixture can be made and added to the boiling wort, or used for other purposes.

The invention includes the final extract or extracts, irrespective of the choice of solvent or the process of manufacture.

*Example No. 1*

The extracting solvent is anhydrous methanol. The extraction is performed at ordinary atmospheric pressure of 760 millimeters of mercury, in an open or closed tank. A closed tank is preferred. The starting material of this example consists of frozen, vine-fresh hop cones. These cones have all their original water in frozen condition, and have all their original non-aqueous ingredients in substantially original condition.

The extraction may be an immersion extraction, in which the frozen cones are at their freezing temperature of minus 20° C. when said hop cones are immersed in a pool of the anhydrous methanol. The temperature of said methanol may be at 120° F. to 130° F., namely, 48.89° C. to 54.44° C. The anhydrous methanol is kept at 120° F. to 130° F. so that the frozen water of the frozen cones is melted within the pool. The frozen cones may be pre-thawed by warming them above 0° C., before contacting them with the solvent, but it is highly preferred to thaw the frozen cones by abstracting heat from the contacting solvent. Instead of extracting by immersion, the extraction may be by percolation.

EXTRACTION STEP

In this example, the weight of the frozen cones is 720 pounds, namely, substantially 324 kilograms.

In this example, immersion extraction is used. A pool of the anhydrous methanol is located in an extracting tank. This tank may be closed, and the material therein may substantially fill the tank, whose cover may be kept closed during the extraction, in order to minimize oxidation.

The volume of the anhydrous methanol in the pool is 0.5 United States gallon to 1.0 United States gallon, per pound of the hop cones.

This corresponds to substantially 4.2 liters to 8.4 liters of anhydrous methanol, per kilogram of the frozen hop cones.

Since the specific gravity of anhydrous methanol is about 0.792, this volume ratio corresponds substantially to 5.4 to 10.8 kilograms of anhydrous methanol, per kilogram of the frozen hop cones.

In this example, the frozen hop cones are promptly immersed in the pool of extracting methanol, which is kept at substantially 49° C.–55° C. A high extraction temperature is undesirable, because it results in loss of brewing value. In general, the maximum temperature during the entire process is 65° C., and a maximum temperature of 55° C. is preferred. In the washing step or steps later mentioned herein, a temperature in excess of 65° C. may be used during a short period, such as twenty minutes.

The immersed frozen hop cones are mixed with the solvent, thus thawing the cones and raising their temperature, until the temperature of the mixture is 49° C.–55° C. When the mixture has this temperature of 49°

C.–55° C., it is stirred during an extraction period of thirty minutes, while the temperature of the mixture is kept at 49° C.–55° C.

This results in a methanol-water extract, which includes water which is extracted from the hop cones. Methanol-soluble and water-insoluble material, such as the resins, is dissolved in the methanol. Water-soluble and methanol-insoluble materials, which are extracted from the hop cones together with water, are dissolved in the water. The percentage of water is preferably not more than 15% by volume, and this preferably does not exceed 10% by volume.

If the extraction is by percolation instead of immersion, the same extracting temperature and ratio of solvent to the starting material and other conditions may be used.

The hop cones absorb some of the methanol.

In this example, a total weight of fifty kilograms of aqueous and non-aqueous material is extracted from the 324 kilograms of frozen hop cones.

At the end of the extracting period, the solid matter in the tank includes the residual hop cones, sand, and possibly other solid material. These residual hop cones have absorbed methanol and less than their original content of water, as later more fully stated.

SEPARATING THE LIQUID EXTRACT FROM THE SOLID, UNDISSOLVED MATERIAL IN THE EXTRACTING TANK

This is done promptly, as at 50° C. for example, by centrifuging, decanting, or filtering.

The separated liquid extract has a dark green color. As above noted, the solvent of said extract is a mixture of methanol and water, with a preferred maximum of fifteen percent of water by volume.

The liquid has a specific gravity of 0.82 at 25° C. and a coefficient of viscosity of 0.816 centipoise at 25° C., so that its viscosity is close to that of water.

At 25° C., a mixture of equal parts by weight of said extract and water has a pH of 5.0.

CONCENTRATING THE METHANOL EXTRACT

This is one of the important factors.

It is of course, well-known to concentrate in a vacuum pan.

The liquid extract becomes very viscous while it is being concentrated and it is finally very viscous and tacky.

If the methanol and water are evaporated by heating a large batch of the extract in an ordinary vacuum pan, it is impossible to heat the extract evenly, as it becomes more and more viscous. This results in loss of brewing value.

If the methanol extract is heated above substantially 50° C., the valuable soft alpha-resin and soft beta-resin become converted to the hard, valueless gamma-resin. As above noted, the maximum temperature in the process is 65° C., preferably 55° C.

The liquid methanol-water extract is heated in the form of thin, rapidly-flowing streams. These streams are externally heated. By thus heating the methanol-water extract in the form of thin layers or streams, said thin streams are evenly heated to 50° C. By pumping these streams at high velocity through the heating tubes or zones, the methanol-water extract does not coat the inner faces of said tubes, as the extract becomes more concentrated, tacky and viscous.

The heated streams are discharged downwardly into a vacuum chamber, which is maintained under low pressure, thus vaporizing the methanol and water at the top of the evaporation chamber or vacuum chamber, and discharging the unevaporated part of the extract into the bottom of the vacuum chamber, from which the unevaporated part of the extract is again pumped through the externally heated thin tubes at high velocity.

At the end of a concentrating operation, the concentrate is in the bottom part of the vacuum chamber, from which the concentrate can be easily removed. For this purpose, the bottom part of the concentrating chamber may have the shape of a conical tank, and this tank-part may have a discharge valve, or it may be removable.

The annexed diagrammatic drawing shows a cylindrical evaporation chamber S, which has an inlet valve SV at its bottom. This inlet valve SV is manually opened or closed. Said inlet valve SV may be connected to a supply pump, which is not shown. The entire initial batch of methanol extract which is to be concentrated, may be located in the bottom of evaporation chamber S at the beginning of the concentration or evaporation step through the open valve SV, which is kept closed after the filling step has been completed. As an alternative, the supply of methanol extract may be supplemented during a concentration step, by opening valve SV temporarily, and pumping additional methanol extract into the bottom part of evaporation chamber S.

The bottom end of the evaporation chamber S is connected by a pipe 2 to a circulation pump 3. This pumps the material which is in the bottom end-portion of chamber S, out of said chamber S and through a pipe 3a, and upwardly through the pipes 4 of a well-known type of pre-heater 5.

Since the pre-heater 5 is a well-known piece of apparatus, it is shown diagrammatically.

This preheater is shown as having a narrow cylindrical tube 4, through which the extract is pumped upwardly at high velocity. This tube 4 extends through a jacket 5a, which has an upper steam inlet 5b and a lower steam outlet 5c.

The heated material flows out of heater 5 through a narrow pipe 6, which is connected to the top of the evaporation chamber S. Said pipe 6 extends below the top of chamber S. Directly below the top of chamber S, said pipe 6 terminates in a substantially horizontal leg, which is substantially tangential to the inner vertical and cylindrical face of evaporation chamber S. The rapidly-flowing material is thus impinged horizontally and tangentially against the top part of the inner, vertical, cylindrical face of evaporation chamber S, so that the incoming material is given a rapid, horizontal, circular tangential movement, thus facilitating evaporation at the top of chamber S. The top of chamber S has an upper vertical outlet pipe 7, through which the vapors rise and flow to the inlet of a condenser 8, which has a tube 9, through which a coolant is flowed. The condensed vapors drop into a closed receiver tank 10, whose upper end is connected to a vacuum pump 11, which maintains a vacuum in receiver tank 10, evaporation chamber S, and in the rest of the apparatus. The collected methanol and water in receiver tank 10 are kept at low temperature, so that they are not vaporized at the low pressure which is maintained by vacuum pump 11.

The evaporation chamber S may be at a temperature of 20° C. to 55° C.

At the beginning of an operation, the vacuum pump 11 pumps air out of the entire apparatus to a suitable reduced pressure, such as 100 millimeters of mercury, and this low pressure is maintained by operating said vacuum pump 11 when necessary.

The pressure in the entire apparatus may be 75 to 175 millimeters of mercury.

In this example, a flowable concentrate can be finally produced in the bottom part of evaporation chamber S.

In this example, the volume of the final concentrate is 3.5% of the volume of the original extract.

This concentrate is an aqueous mixture or emulsion, which contains the extracted resins and other extracted matter, including water extracted from the hop cones, and water-soluble material extracted from the hop cones.

The unevaporated water in the concentrate is preferably sufficient to retain in solution or dispersion all the methanol-insoluble and water-soluble ingredients which were extracted from said hop cones.

Thus, the weight of the aqueous phase of said concentrate, consisting of unevaporated water and water-soluble and methanol-insoluble substances, may be 70% of the weight of said concentrate.

In this example, the pH at 25° C. of a mixture of equal weights of said concentrate and water is 5.8, which is more than the pH of 5.0 of a mixture of equal parts by weight of the original methanol extract and water. Hence the concentrate is less acid than the original methanol extract.

It is optional to evaporate all the water and substantially all of the methanol in this concentration step, in order to produce a concentrate which is included in this invention.

However, it is highly preferred to stop the concentration when the concentrate is flowable and has said aqueous phase, and also to stop the concentration when the concentrate contains a small amount of residual methanol, such as two milligrams of residual methanol per gram of concentrate.

As above noted, the highly preferred final brewing extract is free from the water-soluble hop tannins. By retaining these hop tannins in dissolved or dispersed form in the aqueous phase of the concentrate, said hop tannins can be removed together with the water.

Also, if the concentration period is too long, even at high vacuum under non-oxidizing condition, and even at low concentrating temperature, there is a loss of brewing value.

By directly and externally heating the methanol extract only in narrow pipes 4, through which the methanol extract is rapidly pumped, said methanol extract is uniformly heated in pipes 4, thus preventing local overheating of the methanol extract which would result from heating a large mass of extract, especially as the extract becomes concentrated.

A small percentage of residual methanol is not objectionable, because the extract is added in small concentration to boiling wort, thus evaporating the methanol from the boiling wort.

Also, the methanol can be substantially wholly washed from the resins of the concentrate, after said resins have been separated from the water of the concentrate, thus providing a final brewing extract of the type disclosed in Table 5.

The concentrate is removed from the evaporation chamber S, and it is treated to separate the water-soluble ingredients which have been extracted from the hop cones.

SEPARATING THE RESIN PHASE FROM THE CONCENTRATE

This concentrate is frequently a flowable emulsion or dispersion of the resinous, methanol-soluble and water-insoluble ingredients, which are dispersed in the residual water of the concentrate. This emulsion or dispersion can be broken by centrifuging the concentrate at 50° C., thus separating the resin phase from the aqueous phase and the water-soluble ingredients of the aqueous phase.

Conveniently and optionally, this emulsion or dispersion can be broken at 40° C., by dissolving sodium chloride in the water of the aqueous phase. The sodium chloride is believed to precipitate or salt-out the proteins or nitrogenous substances which produce the emulsion or dispersion in the concentrate. Other agents which precipitate proteins may be used, such as ammonium sulfate. Many such agents for salting-out proteins are well known. It is preferred to use sodium chloride, and to dissolve the sodium chloride in the water of the aqueous phase of the concentrate at 40° C., because this temperature requires a minimum amount of sodium chloride. A concentration of five percent of sodium chloride, calculated upon the weight of the water in the concentrate, is usually sufficient to break the emulsion or dispersion at 40° C.

When the emulsion or dispersion is thus broken at 40° C. by the dissolved sodium chloride, said concentrate separates into an aqueous phase and a resin phase. This resin phase aggregates into a single, coherent, solid mass. This coherent resin phase contains some water. This resin phase, after being washed with water, is the final brewing extract.

The aqueous phase and the water-soluble ingredients dissolved therein, are separated from said coherent resin phase at 40° C., by centrifuging or decanting.

The coherent, separated resin phase is conveniently designated as the "hops resin."

This hops resin contains a very small amount of residual methanol. It has a maximum of 15% of water by weight. It is substantially free from water-soluble or water-dispersible substances such as tannins, carbohydrates, nitrogenous substances, pectin.

In this example, the hops resin has a weight of 20 kilograms. Since it has a maximum of 15% of water by weight, it has at least 17 kilograms of non-aqueous material which have been extracted from the 324 kilograms of hop cones.

At 25° C., this water-insoluble hops resin has a specific gravity of 1.03. It has a deep green color. When this hops resin is mixed with water in equal proportions by weight, the mixture has a pH of 5.8.

This hops resin becomes a pourable fluid at 45° C. It does not have a definite melting point. At 50° C., the viscosity of the hops resin is 130 poises, which is a high viscosity.

The general properties of this resin phase have been described in connection with Table 5.

In this example, the principal ingredients of the separated, water-insoluble ingredients or hops resin are as follows:

TABLE NO. 6

| Ingredient | Percentage by Weight |
|---|---|
| Methanol | 00.002 |
| Alpha-resin | 29.400 |
| Beta-resin | 32.800 |
| Total alpha-resin and beta resin | 62.200 |
| Gamma-resin, hop oil and water | 37.800 |
| | 100.000 |

By comparison with Table No. 5, Table No. 6 has 29.4% of alpha-resin, as compared with 25.2% of alpha-resin in Table No. 5.

The brewing value of the composition of Table No. 6 is, 29.4 plus 8.2=37.6.

Tables 5 and 6 illustrate the variations in the composition of the final brewing extract, due to different starting materials.

When the composition of Table No. 6 is washed to remove substantially all the methanol, the resultant washed extract also has the general characteristics of the composition of Table No. 5.

It is not necessary to use sodium chloride to separate the hops resin from the aqueous phase of the original concentrate, because this can be done by centrifuging at 40° C.

This hops resin of Table No. 6 may be purified, in order to remove substantially all the residual methanol. This can be done by washing with hot water. There may be a plurality of washing steps. The final washed hops resin may have one ten-thousandth of a gram (0.001 gram) of methanol or less, per gram of said hops resin, corresponding to one hundredth of one percent (0.01%) by weight or less.

Without limitation thereto, the separated resin phase or hops resin of Table No. 6 may be purified by stirring it vigorously with pure or distilled water, in the ratio (by weight) of twenty parts to twenty-five parts of the hops resin per one hundred parts of water. The washing temperature may be 30° C. to 100° C. A preferred range of washing temperature is 50° C. to 65° C. If a higher temperature is used, the washing period should be short, in order to prevent loss of brewing value. At this washing temperature of 50° C. to 65° C., the hops resin of Table No. 6 is sufficiently fluid, so that it can be dispersed or suspended in the wash water in the washing tank, in the form of fine drops of fluid. If a washing tank is used, in which the hops resin of Table No. 6 is thoroughly stirred with the water, the pH of the dispersion or suspension, in this example, at the beginning of the washing step, is 5.8 at 50° C. to 65° C.

When the hops resin is suspended or dispersed in the wash water, a stable dispersion or suspension may result. While this suspension or dispersion may be broken by centrifuging at 50° C. to 65° C., the dispersed particles of hops resin can be conveniently aggregated into a single, coherent, pliable mass, by dissolving sodium chloride in the wash water, before or after the stirring and washing have been completed. It is preferable to dissolve the sodium chloride in the wash water, when its temperature is 40° C., as a minimum quantity of sodium chloride is required at this temperature. The weight of the dissolved sodium chloride may be five percent of the weight of the wash water, if its temperature is 40° C.

As the result of a single washing step in this example, the separated and washed hops resin may have 0.000255 gram of residual methanol per gram of the separated and washed hops resin, corresponding to 0.0255 percent by weight; 300 milligrams of beta-resin per gram, corresponding to 30% by weight; and 300 milligrams of alpha-resin per gram, corresponding to 30% by weight.

At 25° C., the washed hops resin has a pH of 5.8 when mixed with an equal weight of water. Said washed hops resin has a specific gravity of 1.04. At 45° C., the washed hops resin, when mixed with an equal weight of water, has a pH of 5.8. At 45° C. said washed hops resin has a viscosity of 148 poises. By using successive washing steps, the proportion of the residual methanol may be as little as 0.0001 gram per gram of hops resin, corresponding to 0.01%, or less. There is little or no loss of the lupulone or humulone complex in the washing.

*Example No. 2*

This illustrates the use of a low extracting temperature of 30° C., also using anhydrous methanol at normal atmospheric pressure.

The starting material was six kilograms of whole, frozen, undried, vine-ripe hop cones, which were extracted without preliminary thawing, so that the frozen vine-ripe hop cones were thawed and warmed to the extracting temperature, while immersed in the solvent. Said six kilograms correspond to 1.683 kilograms of average conventional dried hop cones.

This starting material had all the original water of the whole, undried, vine-ripe hop cones in frozen condition, and it had the other original ingredients of the vine-ripe hop cones or hop flowers, in original undeteriorated form.

The solvent was 35 kilograms of commercial anhydrous methanol, which had a specific gravity of substantially 0.792, corresponding to a volume of substantially 44.2 liters. In this example, immersion extraction was also used at a standard pressure of 760 millimeters of mercury, in an open tank or closed tank.

The 6 kilograms of the hop cones, in their frozen condition, were immersed and stirred in the pool of 44.2 liters of methanol. Said pool was maintained at 30° C. or 86° F.

The temperature of the immersed frozen hop cones was thus raised to 30° C.

The mixture of hop cones and the methanol was then stirred during an extraction period of two hours, while the temperature of the mixture was maintained at 30° C.

At the end of said extraction period of two hours, the liquid extract was separated by filtration at 30° C. from the residual hop cones in the tank. The extraction was also under normal atmospheric pressure.

The weight of the residual hop cones was 5 kilograms.

These residual hop cones had 60% by weight of liquid, namely 3 kilograms of liquid. This liquid consisted (by weight) of 89% of methanol, and 11% of water. Hence the three kilograms of liquid in the residual hop cones had 2.67 kilograms of methanol and 0.33 kilogram of water. As above noted, the frozen hop cones have 65% to 75% of water by weight, namely 3.90 kilograms to 4.5 kilograms of water. Hence nearly all of the original water of the frozen hop cones was removed by the methanol extraction, and some of the methanol was absorbed by the residual hop cones.

The weight of the filtrate was 36 kilograms.

The specific gravity of the 36 kilograms of filtrate was 0.82, corresponding to a volume of substantially 44 liters of filtrate or extract.

At 25° C., the pH of a mixture of equal parts by weight of said filtrate and water had a pH of 5.0.

The viscosity of the filtrate at 25° C. was 0.816. This filtrate was a dark green liquid, which was clear.

This filtrate was immediately concentrated in the previously described apparatus, at 50° C., during a period of four hours, at a pressure of one hundred millimeters of mercury.

This evaporated substantially all the methanol. The concentrate or residue in the bottom of the evaporation chamber S consisted of the methanol-soluble and water-insoluble extracted ingredients, and two hundred grams of water. Substantially all the water-soluble and methanol-insoluble ingredients which had been extracted from the frozen hop cones were dissolved in the two hundred grams of water.

The total volume of the residue was five percent of the volume of the original liquid extract, namely, substantially 2.2 liters. Since this included 0.2 liter of water, the volume of the non-aqueous ingredients of the residue was substantially 2.0 liters.

This concentrate or residue was centrifuged at 30° C. This separated the two hundred grams of water, together with substantially all of the methanol-insoluble and water-soluble ingredients. This example shows that the use of sodium chloride or other salting-out agent is unnecessary. After the water had been thus separated, the weight of the non-aqueous residue was 240 grams.

This residue had, per gram, two milligrams of residual methanol.

This residue had 29.4% of alpha-resin, 32.8% of beta-resin, and 37.8% of other non-aqueous ingredients which were soluble in methanol.

This residue had a dark green color and the other characteristics of the composition of Table 5 and Table 6.

It represented the final brewing extract or hops resin, prior to washing.

As an illustration of the washing step, twenty grams of this hops resin were thoroughly stirred with 100 grams of water at 65° C., during a stirring and washing period of twenty minutes. A larger relative volume of water can be used in any washing step. This resulted in a stable dispersion. This dispersion was cooled in a water bath to 40° C.

Five grams of sodium chloride were dissolved in the water of this dispersion at 40° C., with continued stirring.

In a few minutes after the stirring was stopped, the washed hops resin aggregated into a single, coherent, pliable mass which was separated from the water at 40° C.

The separated, washed hops resin was a viscous paste which had some water. The percentage of sodium chloride therein was 0.6 percent by weight.

It had, per gram, 0.000255 gram of methanol; 300 milligrams of humulone complex or alpha-resin; and 300 milligrams of lupulone or beta-resin. The brewing value was 37.5.

The above washing step was repeated.

The twice-washed hops resin had, per gram, 0.0001 gram of residual methanol; 294 milligrams of lupulone or beta-resin; and 310 milligrams of humulone complex or alpha-resin. Its pH at 25° C. was 5.8 when mixed with an equal weight of water. At 45° C., the viscosity of the extract was 148 poises. This twice-washed resin of Examples 1 and 2 can be used in brewing beer, by adding it to the boiling wort. The percentage of sodium chloride therein is 0.4 percent by weight. The brewing value is 38.3.

*Example No. 3*

20 grams of the unwashed hops resin made according to Example No. 2, containing 0.002 gram (two milligrams of residual methanol per gram, were stirred with 100 grams of water at 45° C., during a period of 20 minutes. The washed hops resin was separated at 30° C. by centrifuging. This example again illustrates that although the use of an aggregating agent such as sodium chloride is desirable, it is not always necessary.

The once-washed hops resin had, per gram 0.0003 gram (three ten-thousandths of a gram) of residual methanol.

This washed hops resin can also be used in brewing.

*Example No. 4*

20 grams of the above-mentioned unwashed hops resin of Example No. 2, which had two milligrams of residual methanol per gram, were suspended and stirred in 100 grams of water at 80° C. for 20 minutes. This washed resin had no substantial loss of brewing value by washing at 80° C. during a short period.

The washed hops resin was separated by centrifuging at 30° C.

It had, per gram, 0.000190 gram of residual methanol, instead of the original 0.002 gram.

*Example No. 5*

Five grams of sodium chloride were dissolved in 100 cubic centimeters of water.

20 grams of said unwashed hops resin of Example No. 2, having 0.002 gram of residual methanol per gram, were stirred for 20 minutes at 60° C. with said sodium chloride solution.

When the stirring was discontinued, the temperature of the mixture being 60° C., the washed hops resin separated as an oily liquid at the top of the sodium chloride solution. This liquid was separated at 60° C. When cooled, it became a resinuous paste.

The resinuous paste or mass had, per gram, 0.000270 gram of residual methanol.

This example illustrates that the sodium chloride can be dissolved in the wash water, prior to adding the hops resin.

*Example No. 6*

The specimen was 20 grams of unwashed hops resin which had, per gram, 0.000480 gram of residual methanol.

This specimen was stirred with 100 cubic centimeters of water at 70° C., during a period of five minutes.

The mixture was then cooled to 10° C. The washed hops resin separated.

The washed hops resin had, per gram, 0.000330 gram of residual methanol.

This washed hops resin was stirred in another batch of 100 cubic centimeters of water at 70° C., for ten minutes, and the mixture was again cooled as above stated.

The resultant twice-washed hops resin had, per gram, 0.000102 gram of residual methanol.

Hence, with or without suitable purification, a non-toxic hops resin can be produced which has a negligible proportion of methanol, and which can be used in brewing and for medicinal purposes.

It is possible to produce an extract which has 35 percent by weight of alpha-resin or humulone complex; and 35 percent by weight of beta-resin or lupulone.

It is thus possible to make a brewing extract whose brewing value is 43.75. Since the improved hops resin or final hop extract is substantially free from water and water-soluble ingredients, it is stable for long periods at normal temperatures of 20° C.–30° C. The improved hops resin or hop extract has little or no absorption of water vapor at temperatures up to substantially 45° C.

It has been noted that it is preferred to use the whole vine-fresh hop cones as starting material, that is, hop cones which have not been cut or ground or otherwise comminuted from their original shape. However, the broad aspect of the invention covers the use of undehydrated, vine-fresh hope cones which have been comminuted.

When the improved solid hops resin or final hop extract of either example is dispersed in water at 45° C. to 80° C. by stirring as above stated, the particle size of a major part of the particles of the dispersion is usually 0.10 microns to 2 microns. This depends on temperature and the vigor of agitation.

Such dispersion or suspension, if maintained at 45° C.–60° C., remains stable if the stirring is stopped, without substantial sedimentation by gravity, during a period of 120 minutes.

Thus, in Example No. 2, if the 100 cubic centimeters of water is a cylindrical column whose height is 100 millimeters, and the stirring is stopped, the dispersion usually remains substantially stable at 45° C. for at least 120 minutes. At the end of said period, not more than 30 percent of said 20 grams ordinarily form a sediment under gravity at the bottom of said column.

The quick and easy dispersion into fine particles of the improved extract in the boiling wort, is a substantial advantage. This dispersion effect is enhanced by mixing the resin extract with an equal weight of said corn syrup.

*Example No. 7*

The undried, vine-fresh hop cones are extracted, as in the preceding examples, under normal atmospheric pressure.

One unit by weight of the hop cones is extracted by percolation with substantially 3.3 to 6.6 units by weight of anhydrous methanol at 49° C. to 55° C., as at 50° C., during an extraction period of four hours. The filtration is at 50° C.

The filtrate is concentrated in the chamber S, above described, at 50° C., under a low pressure of 75 to 175 millimeters of mercury. As in the previous examples, the low air pressure prevents objectionable oxidation of the valuable ingredients.

The resin phase in the concentrate has, per gram, not more than 0.002 gram of residual methanol; 328 milligrams of humulone complex or alpha-resin; 294 milligrams of lupulone or beta resin. This has a brewing value of 40.1. The concentrate has unevaporated water, as previously described. However, the concentrate may be evaporated to substantial dryness.

TYPICAL FORMULA FOR BEER BREWED WITH THE IMPROVED HOP EXTRACT

Total non-aqueous materials:
  16,800 pounds standard malt
  13,300 pounds corn grits
  60 pounds burtonizing salt (gypsum)
  20 pounds sodium chloride
  75 pounds soy bean flakes
  20 pounds of the improved hop concentrate This hops resin extract had 29.4 by weight of humulone complex or alpha-resin; and 32.8% by weight of lupulone or beta-resin.

OPERATIONS IN COOKER

The 20 pounds of burtonizing salt are thoroughly mixed with 175 barrels of water (each barrel having 31.5 United States gallons of water) before adding the 2,000 pounds of standard malt and the 13,300 pounds of corn grits.

The malt is first mashed in at 107° F. (41.67° C.). The mashed malt is held for 30 minutes at 41.67° C. and the grits are then mashed in at 41.67° C.

The cooker mass is then heated to boiling at 100° C. in 70 minutes. The cooker mass is then boiled at 100° C. for 15 minutes.

MIXER

The ingredients used in the mixer are, 14,800 pounds standard malt
160 barrels of water
40 pounds of burtonizing salt The 40 pounds of burtonizing salt are thoroughly mixed with the 160 barrels of water. The 14,800 pounds of standard malt are mashed into the 160 barrels of water at 107° F. (41.67° C.). The mixture is held at 41.67° C. for one hour.

The mash from the cooker is then dropped into the mixer during a period of fifteen minutes, at 41.67° C., and the temperature in the mixer is then raised to 165° F. (73.89° C.). The entire mixture is mixed in the mixer at 73.89° C. for 45 minutes. The entire mixture is then discharged into the clarifying or "lauter" tank at 73.89° C.

LAUTER TANK

The mash discharged from the mixer is kept in the lauter tank at 160° F. for some minutes. The clear wort is first run off. The residue is sparged until the last wort is substantially pure water.

The wort is discharged into the boiling kettle, where the hop concentrate is added.

BOILING KETTLE

After the wort from the lauter tank is discharged at 160° F. into the boiling kettle, the 20 pounds of sodium chloride are dissolved in the wort, and the wort is then boiled at 100° C. under normal atmospheric pressure for sixty minutes. The 20 pounds of said improved hop concentrate are then added in one addition, and the contents of the kettle are boiled at 100° C. under normal atmospheric pressure for 30 minutes and are then discharged at 100° C. from the kettle, cooled, filtered and transferred to the fermentation cellars.

The above formula and procedure result in 630 barrels of wort at about 12° Balling.

This wort is fermented in the usual manner and further procedure is conventional.

The brewing value of the final extract as calculated as stated herein may be in the range of 30 to 45, preferably in the range of 34 to 42.

Irrespective of brewing value, the improved extract can be used as a substitute for hops for many other purposes, such as a flavoring agent.

As shown in Tables 1, 2, 3, 4, the ratio of alpha-resin to beta-resin in freshly-dried conventional hops is in a range of substantially 52% to 64%. As shown in Table No. 4, this ratio can drop to about 23%, as the result of storage.

In Table No. 5, the ratio of alpha-resin to beta-resin is substantially 50%.

In Table No. 6, the ratio of alpha-resin to beta-resin is substantially 90%. As previously noted, this ratio by weight may be 100%.

Hence, irrespective of the calculation of brewing value as determined herein, the invention includes an extract of substantially vine-fresh hop cones, or of frozen, substantially vine-fresh hop cones, in which the ratio by weight of alpha-resin to beta-resin is as low as 40%, preferably a minimum value of 50%. This ratio will depend upon the starting material. Such extract is included in the invention, even if mixed with a carrier or diluent, as exemplified by corn sirup.

We have described preferred embodiments of our invention, but numerous changes, omissions, additions and substitutions can be made without departing from its scope.

We claim:

1. A method of extracting solid starting material, said starting material having substantially the composition of vine-fresh hops, which consists in extracting said material with 95% methanol at a maximum temperature of 65° C. to produce an original liquid extract of said starting material, said original liquid extract including water which is extracted from said starting material, said water being mixed with said methanol in said original liquid extract, said original liquid extract including water-insoluble and methanol-soluble material which is extracted from said solid starting material and which is dissolved in the methanol of said original liquid extract, said original liquid extract including water-soluble and methanol-insoluble material which is extracted from said solid starting material and which is dissolved in the water of said original liquid extract, said methanol-soluble and water-insoluble extracted material including alpha-resin and beta-resin, the weight of said alpha resin being at least 40% of the weight of the total soft resin; separating said original liquid extract from the undissolved, residual part of said starting material; flowing the separated, original liquid extract forwardly through an externally heated zone in the form of a thin, rapidly forwardly-flowing stream to heat said forwardly-flowing stream substantially uniformly within said heating zone without substantially evaporating methanol or water from said forwardly-flowing stream within said heating zone, forwardly flowing said forwardly-flowing stream within said heating zone at a sufficiently high velocity to substantially prevent the solutes of said forwardly-flowing stream from coating the inner face of said heating zone; flowing said forwardly-flowing stream out of the outlet of said heating zone into an evaporation chamber; evaporating a part of the methanol and water in said evaporation chamber from the stream which is flowed into said evaporation chamber and thus providing a residue of said stream within said evaporation chamber, flowing the evaporated methanol and water out of said evaporation chamber; flowing the residue of said stream out of said evaporation chamber forwardly through said heating zone and back into said evaporation chamber in cyclic succession while evaporating a part of the methanol and water from the stream which is flowed into said evaporation chamber during each cycle and flowing the part of the methanol and water which is thus evaporated during each cycle out of said evaporating chamber, maintaining said evaporation chamber at a maximum temperature of substantially 65° C. and at a maximum pressure of substantially 175 millimeters of mercury, and continuing said cyclic succession to produce a concentrate of said original extract in which the weight of said alpha-resin is at least 40% of the weight of the total soft resin.

2. A method according to claim 1 in which substantially all the methanol is evaporated in said cyclic succession within said evaporation chamber from said original extract.

3. A method according to claim 1, in which the cyclic succession is stopped when said concentrate includes an aqueous phase of residual water and a non aqueous methanol resin phase in which said resins are dissolved, and said aqueous phase is separated from said methanol resin phase.

4. A method according to claim 3, in which said aqueous phase is separated from said methanol resin phase by dissolving a water-soluble salting-out agent in said aqueous phase.

5. A method according to claim 3, in which the weight of said aqueous phase is at least substantially 70% of the weight of said concentrate.

(References on following page)

References Cited in the file of this patent

UNITED STATES PATENTS

| | | |
|---|---|---|
| 1,800,632 | Horst | Apr. 14, 1931 |
| 2,450,774 | Zahm | Oct. 5, 1948 |
| 2,473,395 | Segal | June 14, 1949 |
| 2,562,934 | Michener | Aug. 7, 1951 |
| 2,824,803 | Stark | Feb. 25, 1958 |

OTHER REFERENCES

"A Survey of Procedures for Grading the Quality Standards of Hops," by W. B. Thomas, 2 pp. Reprinted from October 1938 issue of Western Brewing World.